United States Patent [19]

McKinnon

[11] 3,776,512
[45] Dec. 4, 1973

[54] APPARATUS FOR STIRRING GRAIN

[75] Inventor: Richard E. McKinnon, Taylorville, Ill.

[73] Assignee: Specialized Products, Inc., Taylorville, Ill.

[22] Filed: June 3, 1971

[21] Appl. No.: 149,777

Related U.S. Application Data

[63] Continuation of Ser. No. 889,469, Dec. 31, 1969, abandoned.

[52] U.S. Cl. ............................................. 259/102
[51] Int. Cl. ............................................. B01f 7/00
[58] Field of Search .................... 259/95, 99, 108, 259/111, 102, 103; 34/181

[56] References Cited
UNITED STATES PATENTS

| | | | |
|---|---|---|---|
| 3,156,541 | 11/1964 | Kalke | 34/181 |
| 3,251,582 | 5/1966 | Murphy | 259/111 |
| 3,272,480 | 9/1966 | Sukup | 259/111 |
| 3,410,537 | 11/1968 | Fienhold | 259/111 |
| 3,445,091 | 5/1969 | Jackson | 259/111 |
| 3,448,966 | 6/1969 | Sukup | 259/111 |

Primary Examiner—James R. Boler
Assistant Examiner—G. V. Larkin
Attorney—Koenig, Senniger, Powers & Leavitt

[57] ABSTRACT

Apparatus for stirring a mass of grain in a storage bin for aerating the grain to dry it and for blending the grain for controlling moisture variation in the grain throughout the mass from bottom to top, having a plurality of vertical augers rotatable on their axes for moving grain upward, these augers moving radially outward relative to the central vertical axis of the bin while making a sweep around the bin in one direction, and radially inward on a successive sweep around the bin in the opposite direction.

19 Claims, 10 Drawing Figures

3,776,512

APPARATUS FOR STIRRING GRAIN

CROSS-REFERENCE TO RELATED APPLICATION

This application is a continuation of U.S. Pat. application Ser. No. 889,469, filed Dec. 31, 1969, now abandoned.

BACKGROUND OF THE INVENTION

This invention relates to apparatus for stirring grain, and more particularly to apparatus for stirring a mass of grain in a storage bin for aerating the grain to dry it and for blending the grain for controlling moisture variation in the grain throughout the mass from bottom to top.

Reference may be made to U.S. Pat. No. 3,156,541 and 3,272,480 for prior apparatus for stirring grain in the field of this invention. The apparatus shown in 3,272,480, for example, has been generally satisfactory but generally takes a considerable length of time for stirring the entire mass of grain in a bin.

SUMMARY OF THE INVENTION

Among the several objects of this invention may be noted the provision of apparatus for stirring a mass of grain in a storage bin adapted to stir the entire mass in considerably less time than required by prior stirring apparatus; the provision of such apparatus which has a vertical stirring action allowing columns of heated air to pass from the bottom of the bin upward entirely through the mass of grain and effecting a gentle blending of the grain, without damage to the grain, for control of moisture variation in the mass of grain from bottom to top, functioning to remove moisture from the grain more evenly as well as faster than prior stirring apparatus; the provision of such apparatus adapted for variation of the blending pattern to take care of special conditions, e.g., a need for extra blending at cool spots such as on the north side of a bin; and the provision of such apparatus which is relatively economical to manufacture and install, and reliable and economical in use. In general, apparatus of this invention comprises a sweep member mounted for rotation in a generally horizontal plane above the mass of grain in the bin about a central vertical axis, means for effecting sweeping movement of the sweep member around the vertical axis first through a revolution in one direction and then through a revolution in the opposite direction. Movably mounted on the sweep member is at least one auger carrier, having an auger extending down therefrom and having means for rotating the auger on its axis. The apparatus also comprises means for moving the auger carrier radially inward on the sweep member on a revolution of the sweep member in one direction and radially outward on said member on a revolution of said member in the opposite direction. Other objects and features will be in part apparent and in part pointed out herein-after.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
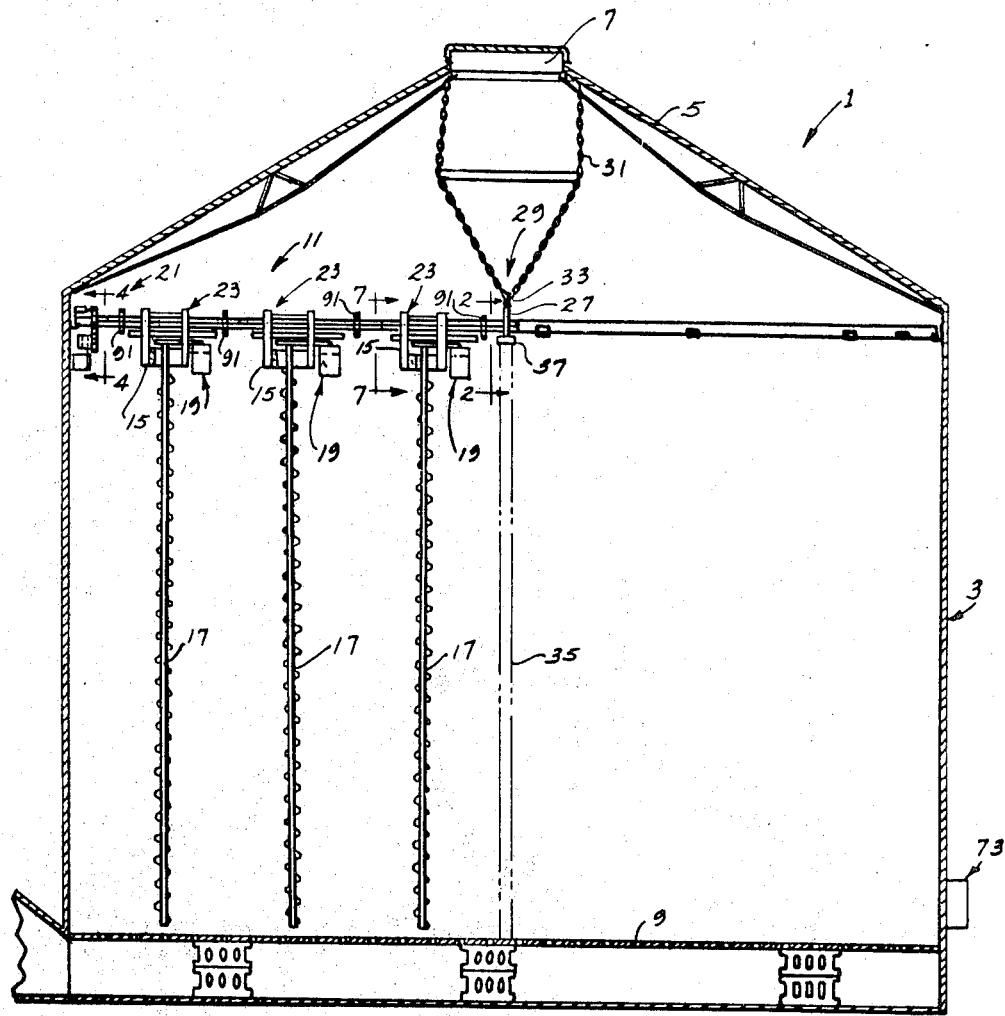
FIG. 1 is a section of a bin for storing and drying grain having mounted therein a stirring apparatus of this invention.

Referring to FIG. 1 of the drawings, there is indicated generally at 1 a circular bin for storage of grain, the cylindrical wall of the bin being designated 3 and its roof being designated 5. The roof, as illustrated, is conical with a central opening 7 through which grain is delivered to fill the bin generally to a level below the top of the cylindrical wall 3. The bin has a foraminous false floor 9; hot air is blown into the space under this floor and blows up through the grain to dry it. At 11 is generally indicated apparatus of this invention for stirring the grain, involving lifting and loosening it, to expedite the aeration of the grain and to blend it.

Figure 2:
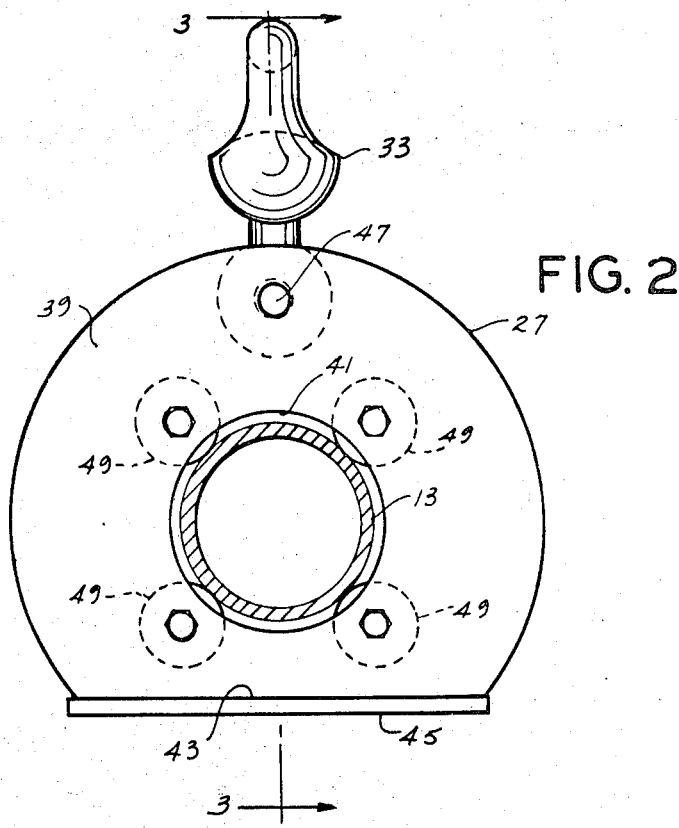
FIG. 2 is an enlarged section on line 2—2 of FIG. 1 of a center bearing for a horizontal sweep member of the apparatus.
Figure 3:
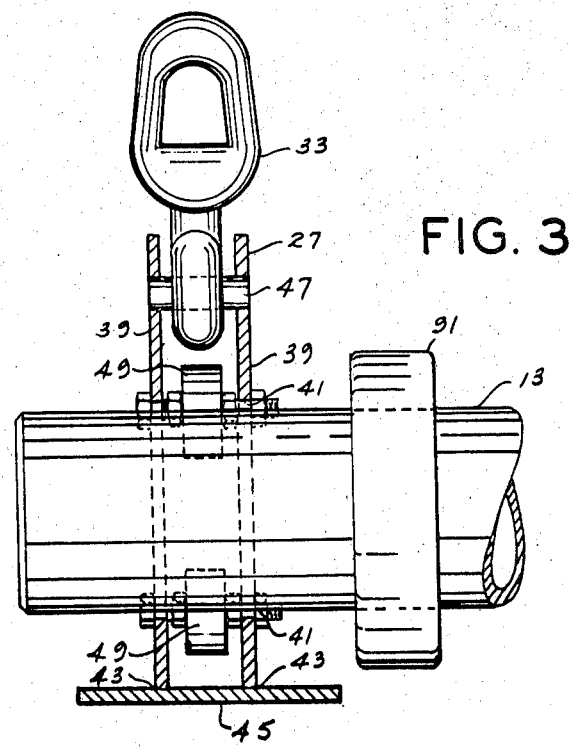
FIG. 3 is a section on line 3—3 of FIG. 2.

The stirring apparatus 11 comprises a sweep member or sweep arm 13, disposed in a generally horizontal plane above the grain and adapted for rotation about the central vertical axis of the bin 1, and at least one auger carrier 15 mounted on the sweep member. However, as shown in FIG. 1, normally a plurality of auger carriers will be mounted on the sweep member. Each auger carrier is movable radially inwardly and outwardly with respect to the vertical axis of the bin and has an auger 17 extending downwardly therefrom with its lower end adjacent the false floor 9 of the bin. The stirring apparatus further comprises means indicated generally at 19 for rotating the auger in one direction about its axis to move the grain upwardly, means indicated generally at 21 for moving the sweep member 13 around the vertical axis of the bin first through a revolution in one direction and then through a revolution in the opposite direction, and means indicated generally at 23 for moving the auger carrier radially inwardly on the sweep member on a revolution of the sweep member in one direction and radially outwardly on the sweep member on a revolution of said member in the opposite direction. and The sweep member 13 is constituted by a shaft of circular cross section, formed by a length of pipe, having a generally uniform diameter throughout its length except for a short outer end portion 25 adjacent the bin wall 3, which has a smaller diameter. The inner end of the shaft is journaled in a bearing 27. Means for mounting the bearing 27 for rotation about the center vertical axis of the bin above the mass of grain in the bin is indicated generally at 29, and is shown to comprise a chain 31 and swivel connector 33 constituting a suspension for suspending the bearing from the roof of the bin. A center post 35 (shown in phantom in FIG. 1) may be used instead of the chain 31 anc swivel 33 if so desired. If the center post 35 is used, means for mounting the bearing 27 for rotation about the vertical axis of the bin includes a thrust bearing 37 on the upper end of the post 35. As shown in FIGS. 2 and 3, bearing 27 comprises a pair of part-circular spaced-apart plates 39 having coaxial center openings 41. The bottom 43 of each plate is cut off horizontally and fastened to a rectangular base plate 45. A pin 47 extends through the upper portion of the plates 39, 39 and through an eye of the swivel connector 33. Swivel connector 33 provides a link between bearing 27 and the chain 31 and supports the bearing for rotation about the vertical axis of the bin above the mass of grain therein. Four rollers 49 are pivotally mounted between the plates 39 adjacent the openings 41. Rollers 49 extend inwardly a slight distance past the edge of the openings to engage the shaft 13 and allow it to rotate about its own longitudinal axis.

Figure 4:
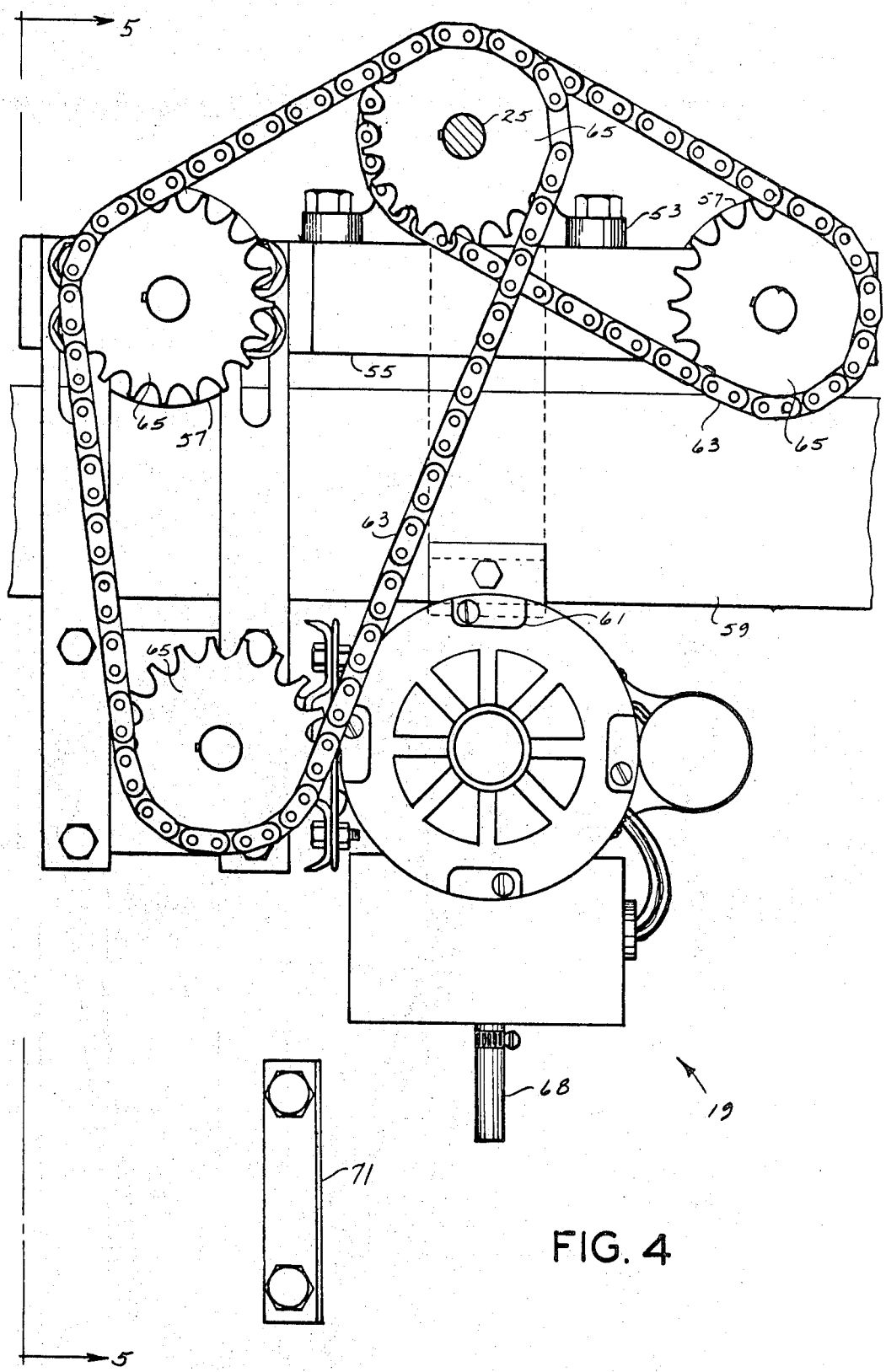
FIG. 4 is an enlarged section on line 4—4 of FIG. 1 showing means for rotating the sweep member about a vertical axis.
Figure 5:
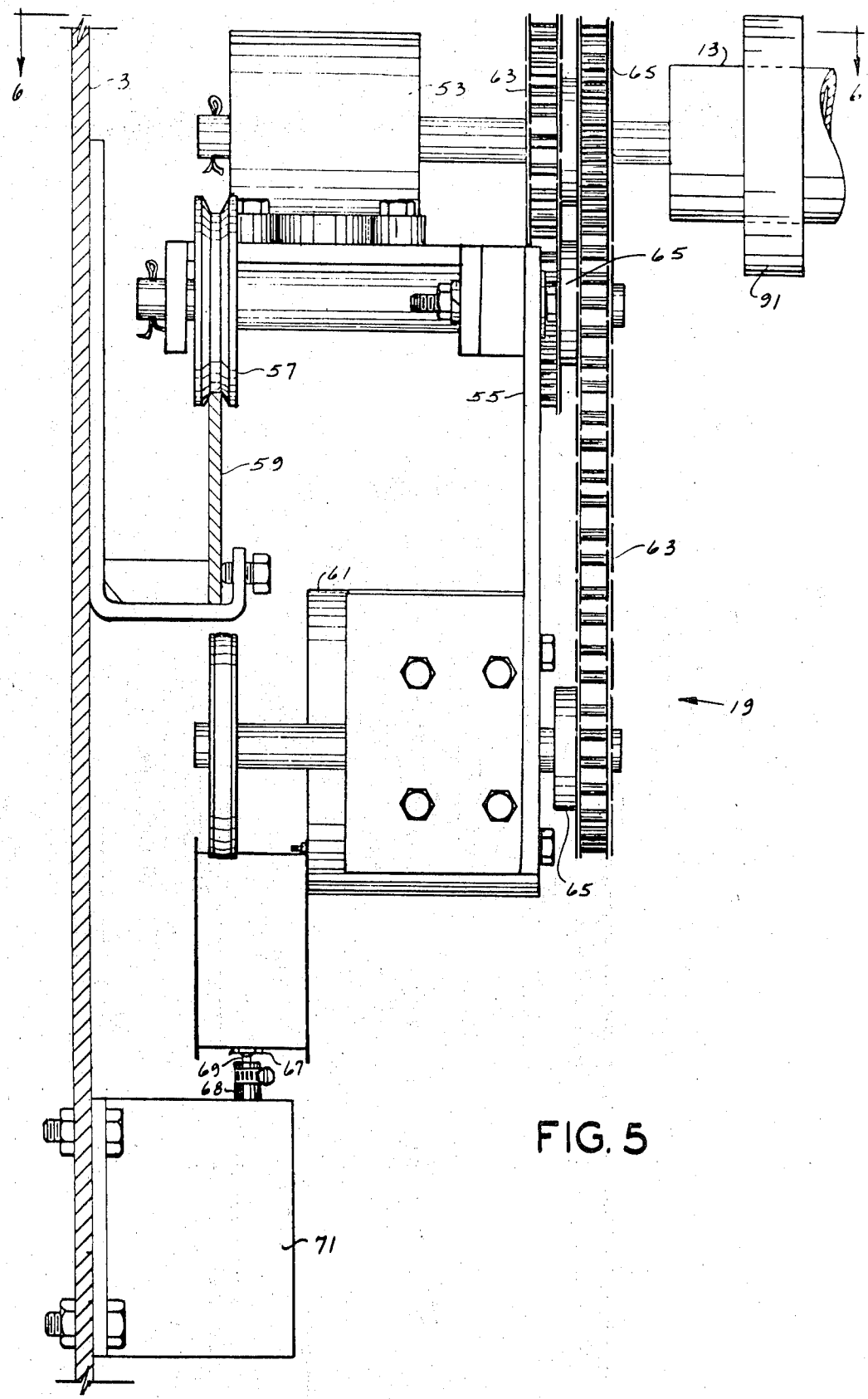
FIG. 5 is a view on line 5—5 of FIG. 4 with certain parts shown in section.
Figure 6:
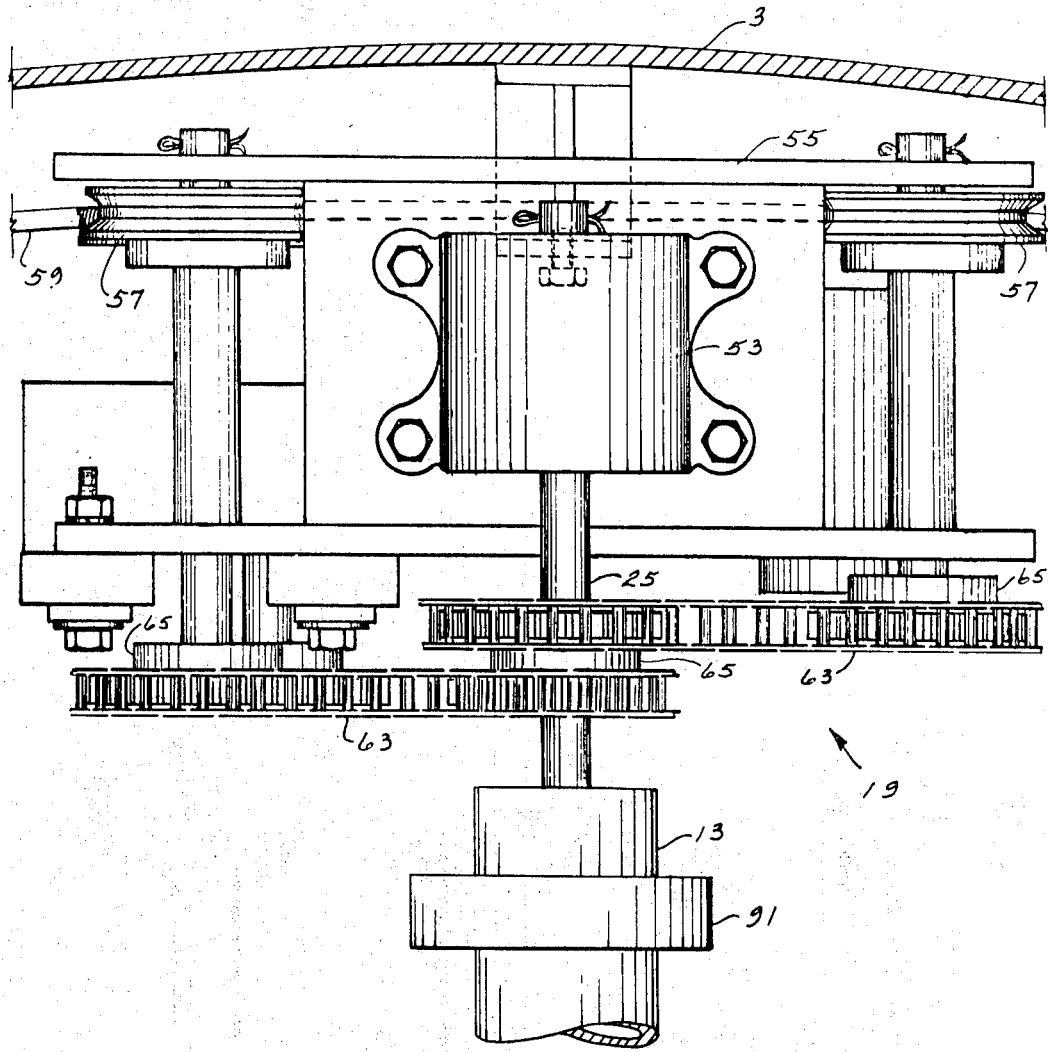
FIG. 6 is a view on line 6—6 of FIG. 5 with certain parts shown in section.
Figure 7:
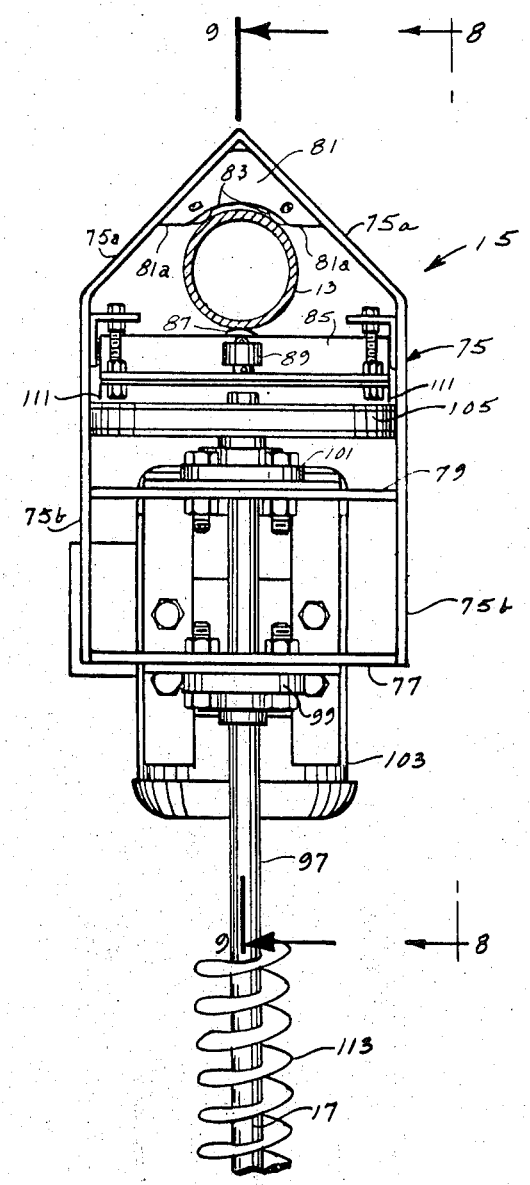
FIG. 7 is an enlarged vertical section on line 7—7 of FIG. 1 showing an auger carrier.
Figure 8:
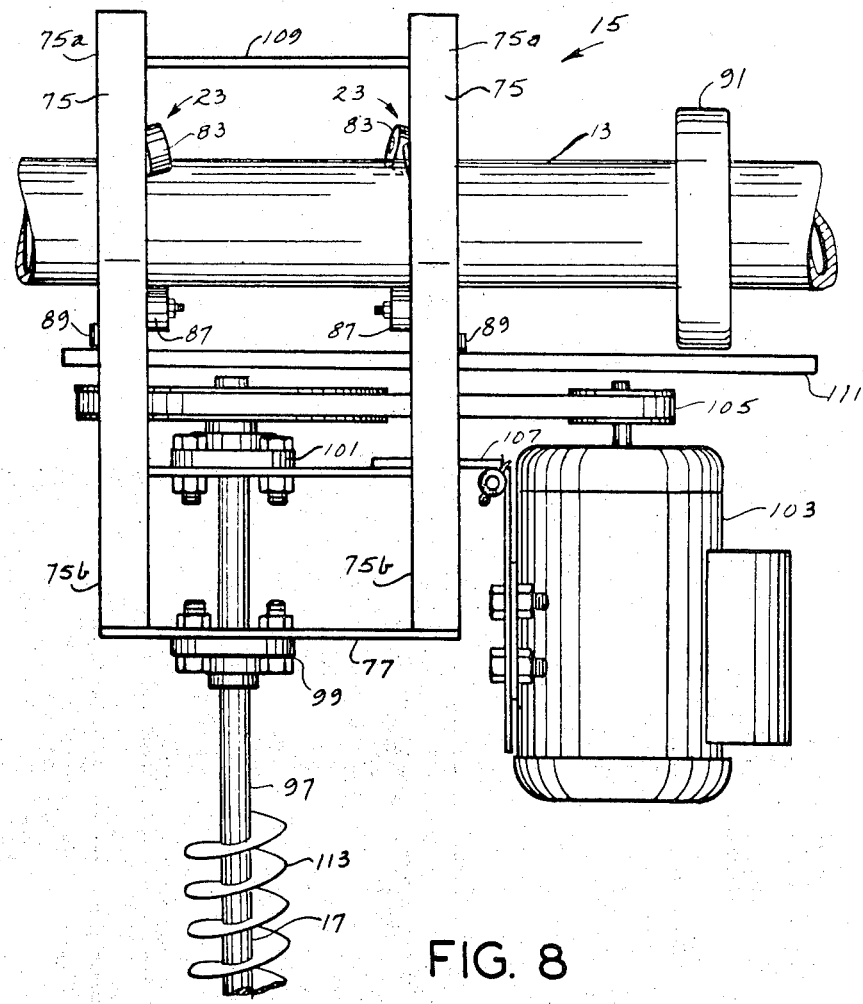
FIG. 8 is a view on line 8—8 of FIG. 7.

Indicated generally at 19 in FIGS. 4, 5 and 6 is means for effecting sweeping movement of the shaft or sweep member 13 around the vertical axis of the bin, first through a revolution in one direction and then through a revolution in the opposite direction. Means 19 comprises a bearing 53 for journaling the short, smaller diameter portion 25 of the shaft in a frame or carriage 55 at the outer end of the shaft and a pair of wheels 57 on the carriage rolling on a circular track 59 extending around the bin. Also mounted on the carriage 55 is a drive means comprising a reversible electric motor 61 and a chain drive having a series of roller chains 63 and sprockets 65, interconnecting the motor 61, wheels 57 and the shaft or sweep member 13. The drive means is adapted to rotate the shaft 13 about its own axis and to roll the wheels 57 on the circular track 59 to cause the shaft to revolve about the vertical axis of the bin. Tripping means is provided for reversing the drive means upon the completion of each revolution of the shaft about the vertical axis of the bin. This means, as shown, comprises a reversing switch 67 mounted on the carriage 55 and electrically connected to the motor. The reversing switch 67 is a toggle switch having a rubber tube 68 extending downwardly from its operating handle 69 engageable with a plate 71 constituting an arm extending radially inwardly from the wall 3 of the bin and disposed below the track 59. The rubber tube 68 provides a flexible extension which prevents damage to the reversing switch 67 in case of a malfunction or jam. Upon each revolution of the carriage and shaft about the vertical axis of the bin, the tube 68 contacts arm 71 to swing the handle 69 to actuate the reversing switch 67 to reverse the direction of rotation of the motor 61, causing the shaft 13 to change its direction of rotation about its own axis and about the vertical axis of the bin.

Indicated generally at 73 in FIG. 1 is means for varying the arc through which the shaft or sweeping member 13 sweeps. This comprises an electric timing means adapted to reverse the direction of rotation of the electric motor 61 at the end of a predetermined time interval, changing the direction of rotation of the wheel and the shaft with each reversal of the electric motor 61. By changing the duration of the time interval, the arc through which the shaft sweeps between reversals may be varied to provide various blending patterns to take care of conditions requiring localized stirring.

Each auger carrier 15 (see FIGS. 1 and 7-9) is movable radially inwardly and outwardly on the shaft or sweep member 13 and has an auger 17 extending downwardly therefrom. The carrier 15 comprises a pair of spaced-apart flat bars 75 bent at their centers to inverted V-shape as indicated at 75a to straddle the shaft and then bent downwardly to form four generally vertical corner posts 75b for the carrier. The lower ends of the bars are fastened to a rectangular bottom plate 77. An intermediate plate 79, having the same size and shape as the bottom plate 77, is disposed parallel to and slightly above the bottom plate, being fastened to the bars. A gusset plate 81 is fastened to the apex of the inverted V-shaped portion 75a of each bar 75. Each gusset 91 has its lower margin bent as indicated at 81a. Mounted on this bent portion of the gusset is a pair of rollers 83 which bear on the upper portion of shaft 13, and which are skewed relative to the shaft. This skewed relation of the rollers relative to shaft 13 provides for radial movement of the auger carrier 15 with respect to the vertical axis of the bin. Thus, rollers 83 constitute the means 23 in engagement with the shaft or sweep member 13 for moving the carrier 15 radially inward on the rotation of the shaft in one direction about its longitudinal axis and radially outward on rotation of the shaft or sweep member in the opposite direction about its longitudinal axis.

A pair of angle irons 85 is disposed parallel to and slightly above the intermediate plate 79 between the downwardly extending portion 75b of each bar 75 with one leg of the angle extending upwardly and the other leg extending outwardly. The angle irons 85 are fastened to the bars 75 so as to allow vertical adjustment thereof. Mounted at the longitudinal center of each leg of each angle are rollers 87 and 89. The rollers are disposed so that their axes are perpendicular to the leg upon which they are mounted and so that a portion of each roller extends beyond the free (upper) edge of its respective leg. Rollers 87, 87 are mounted on the vertical legs of the angles and are disposed to engage the bottom of the shaft. Rollers 89 are mounted on the outwardly extending legs of the angles and extend beyond each end of the auger carrier. Rollers 89, 89 are adapted to contact collars 91 disposed at predetermined intervals along the shaft for limiting the inward and outward movement of the auger carrier 15. A plurality of auger carriers 15 are spaced along the length of the shaft as shown in FIG. 1. Each carrier is movable radially inwardly and outwardly on the shaft 13 with an auger extending downwardly from each auger carrier. When the shaft 13 begins to rotate in one direction, each carrier moves inwardly or outwardly (depending on the direction of rotation of the shaft) until the roller 89 at the leading end of the carrier engages the respective collar 91, which arrests further radial movement of the carrier with respect to the vertical axis of the bin. The time interval of the radial movement of the carrier is preferably small relative to the time required for the shaft 13 to complete one revolution about the vertical axis of the bin.

The bottom and intermediate plates 77 and 79 have coaxial openings 93 and 95 for vertical passage of an auger shaft 97 therethrough, this shaft being journaled in thrust bearings 99 and 101 on the plates 77 and 79. The bearings 99 and 101 support the auger and allow it to rotate about its own axis. An electric motor 103 and a V-belt drive 105 constitute the means 19 for rotating the auger on its axis. The motor is mounted to the intermediate plate by a hinge mount 107 so disposed that the weight of the motor applies tension to the V-belt drive 105. A tie rod 109 extends between the gussets 81 to stiffen the upper portion of the carrier. A cover plate 111 is fastened to the bottom side of the angle irons 85, 85 and extends horizontally over the V-belt drive 105 and motor 103 to protect them from grain fed through the center opening in the roof of the bin.

The auger 17 comprises the auger shaft 97 and spiraling flights 113 extending from the lower end of the auger shaft to a point slightly below the auger carrier. The auger is adapted to move grain upward as it is rotated on its own axis.

Figure 10:
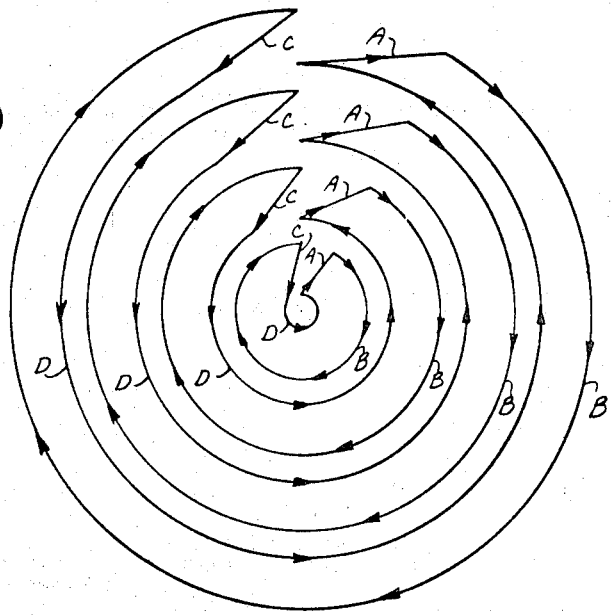
FIG. 10 shows the cyclic movement of four augers as the sweep member makes a sweep around the bin in one direction and reverses its direction to make a sweep around the bin in the opposite direction to complete one cycle.
Figure 9:
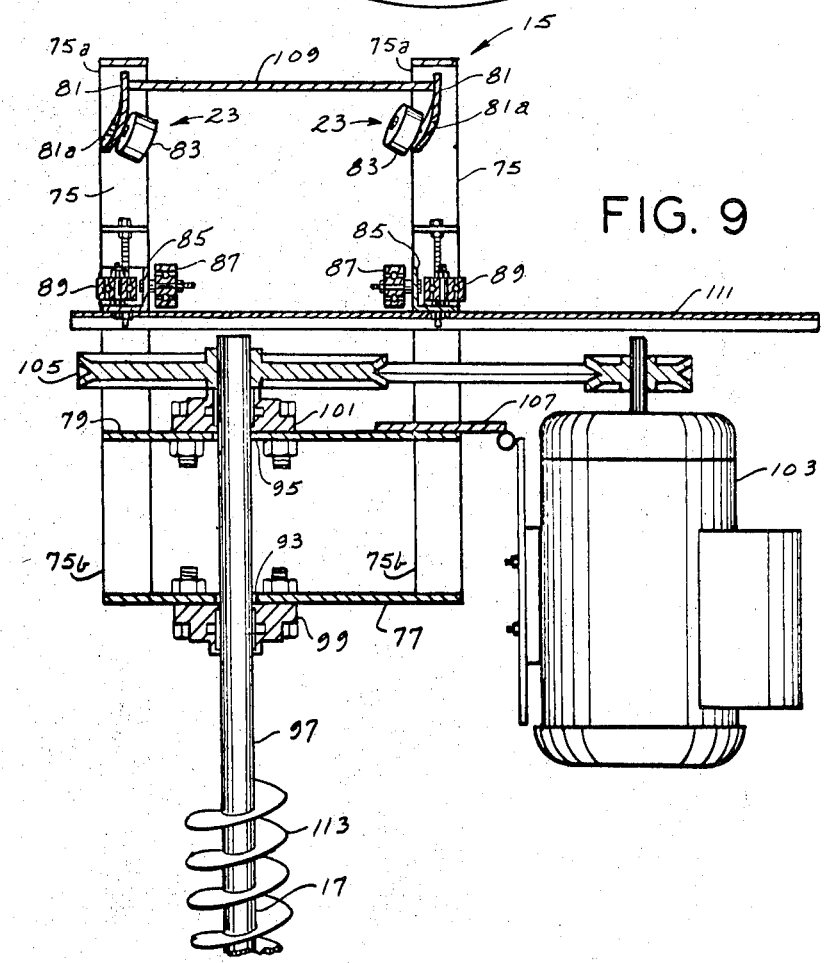
FIG. 9 is a vertical section on line 9—9 of FIG. 7.

Operation is as follows:

Each auger 17 is continuously rotated about its vertical axis in the dirction for augering grain upward by the respective auger drive motor. It will be assumed that motor 61 is energized to drive the wheels 57 in the direction to cause the shaft 13 to sweep around the bin about the vertical axis of the swivel connection 33 (i.e., the vertical axis of the bin) in clockwise direction as viewed from above. Motor 61 also drives the shaft 13 for rotation thereof about its own axis in clockwise direction as viewed in FIG. 4 (counterclockwise as viewed in FIG. 7). With shaft 13 rotating in this direction on its own axis, the auger cariers 15 move radially outward on the shaft under the action of the skewed rollers 83 engaging the upper portion of the shaft. The auger carriers 15 (and hence the augers 17) move radially outward on the shaft 13 (which is sweeping around the bin clockwise as viewed from above) until the outer end rollers 89 thereon engage the respective collars 91 on the shaft, whereupon their radially outward movement is arrested. Shaft 13 continues to rotate on its own axis as it sweeps clockwise around the bin, as permitted by slippage between the shaft and the skewed rollers 83. The auger carriers 15 (and augers 17) complete their outward movement shortly after the shaft 13 has started a clockwise sweep. After the outward movement of each auger has been completed, it then travels around the bin clockwise in a circular path. Referring to FIG. 10, the outward movement of each of the augers 17 (of which four are shown) is represented at A, and its clockwise circular movement after it has completed its outward movement is indicated at B.

As the shaft 13 completes a clockwise sweep, the extension tube 68 on the switch handle 69 engages the plate 71 to throw handle 69 over to effect reversal of the motor 61. Wheels 57 are then driven in the direction to cause the shaft 13 to sweep back counterclockwise around the bin axis and to rotate counterclockwise as viewed in FIG. 4 about its own axis. With the shaft 13 rotating in this direction on its own axis, the auger carriers 15 move radially inwardly on the shaft under the action of the skewed rollers 83. The auger carriers 15 (and augers 17) move radially inward on shaft 13 until the inner end rollers thereon engage the respective collars on the shaft 13, whereupon their radially inward movement is arrested. Shaft 13 continues to rotate on its own axis as it sweeps counterclockwise around the bin, as permitted by slippage between the shaft and the skewed rollers 83. The auger carriers 15 (and augers 17) complete their inward movement shortly after the shaft 13 has started its counterclockwise sweep. After the inward movement of each auger has been completed, it then travels around the bin counterclockwise in a circular path. Referring to FIG. 10, the inward movement of each of the augers 17 is represented at C, and its counterclockwise circular movement after it has completed its inward movement is indicated at D. As the shaft 13 completes its counterclockwise sweep, tube 68 on switch handle 69 engages the plate 71 to throw handle 69 over to effect reversal of the motor, and the shaft then starts back on a clockwise sweep to repeat the cycle.

From the above, it will appear that each auger 17 travels clockwise (as viewed from above) in a circular arc around the vertical central axis of the bin, then inward toward the center of the bin, then counterclockwise (as viewed from above) in a circular arc of smaller radius than the clockwise arc, then outward away from the center of the bin, and repeats this cycle until the apparatus is shut off. When the augers travel clockwise around the bin, they not only lift the grain but tend to move it inwardly toward the center of the bin; when they travel counterclockwise around the bin, they not only lift the grain but tend to move it outwardly toward the bin wall. As a result, the grain is blended not only from the bottom to the top of the bin, but also from the center of the bin out to the bin wall, and vice versa. The blending is gentle, so that the grain (e.g., kernels of corn) is not damaged. The stirring enables columns of hot air to pass upward entirely through the mass of grain for rapid drying, with even drying of the grain throughout its mass.

By varying the arc through which the shaft 13 sweeps (for example, limiting its travel to 90° or one-fourth of a revolution by setting the timer included in means 73 for varying the arc through which the shaft sweeps) stirring may be localized in relatively small areas to take care of special conditions, e.g., to remove cool spots which often occur on the north side of the bin, or to aerate hot spots caused by the fermentation of moist packed grain.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for stirring a mass of grain stored in a bin comprising
    a sweep member, means mounting said sweep member for rotation in a generally horizontal plane above the mass of grain in the bin about a central vertical axis,
    means for effecting sweeping movement of said member around said vertical axis first through a revolution in one direction and then through a revolution in the opposite direction,
    at least one auger carrier movable radially inwardly and outwardly on said sweep member,
    an auger extending downwardly from said auger carrier,
    means for rotating said auger on its axis,
    and means for moving said carrier radially inwardly on said sweep member on a revolution of said member in said one direction and radially outwardly on said member on a revolution of said member in the opposite direction.

2. Apparatus as set forth in claim 1 wherein said sweep member is rotatable on its own horizontal axis in one direction on a revolution thereof in said one direction about said vertical axis, and in the opposite direction on its own axis on a revolution thereof in said opposite direction about said vertical axis, and wherein said means for moving the auger carrier comprises means on the carrier in engagement with the sweep member for moving the carrier radially inward on rotation of the sweep member in one direction about its longitudinal axis and radially outward on rotation of the sweep member in the opposite direciton about its longitudinal axis.

3. Apparatus as set forth in claim 2 wherein the sweep member is constituted by a shaft of circular cross section and said means in engagement therewith comprises roller means on the auger carrier skewed in relation to the shaft.

4. Apparatus as set forth in claim 1 having a plurality of auger carriers spaced along the length of the sweep member each movable radially inward and outward on said sweep member, with an auger extending down from each said auger carrier, means for rotating each auger on its axis, and means for moving each of said carriers radially inward on said sweep member on a revolution of said member in said one direction and radially outward on said member on a revolution of said member in the opposite direction.

5. Apparatus as set forth in claim 4 wherein said sweep member is rotatable on its own longitudinal axis in one direction on a revolution thereof in said one direction about said vertical axis, and in the opposite direction on its own axis on a revolution thereof in said opposite direction about said vertical axis, and wherein said means for moving each auger carrier comprises means on the carrier in engagement with the sweep member for moving the carrier radially inward on rotation of the sweep member in one direction about its longitudinal axis and radially outward on rotation of the sweep member in the opposite direction about its longitudinal axis.

6. Apparatus as set forth in claim 5 wherein the sweep member is constituted by a shaft of circular cross section and said means in engagement therewith comprises roller means on the auger carrier skewed in relation to the shaft.

7. Apparatus as set forth in claim 6 wherein the shaft has collars thereon limiting the inward and outward movement of the auger carriers.

8. Apparatus as set forth in claim 7 having a bearing for the inner end of the shaft and means for mounting said bearing for rotation about said central vertical axis above the mass of grain in the bin.

9. Apparatus as set forth in claim 8 wherein said bin includes a roof and the means for mounting the bearing in a suspension suspending the bearing from the roof of the bin.

10. Apparatus as set forth in claim 8 wherein the means for mounting the bearing is a center post in the bin.

11. Apparatus as set forth in claim 8 wherein the means for effecting sweeping movement of said member around said vertical axis comprises a bearing for the outer end of the shaft on a carriage at the outer end of the shaft, wheels on said carriage rolling on a circular track around the bin, reversible drive means on said carriage adapted to rotate the shaft about its own axis and to roll the wheels on the track thereby rotating the shaft about the vertical axis of the bin, and means for reversing said drive means upon the completion of each revolution of the shaft about said vertical axis, whereby the direction of rotation of the shaft about said vertical axis and about its own axis is reversed upon completion of each revolution of the shaft about the vertical axis of the bin.

12. Apparatus as set forth in claim 11 wherein the means for reversing said drive means comprises a toggle switch mounted on the carriage, an arm fastened to the bin wall slightly below the track, the arm extending inwardly from the bin wall, and a flexible extension fastened to the handle of the toggle switch, the toggle switch being adapted to reverse said drive means upon each actuation thereof, the flexible extension being adapted to contact said arm to actuate the toggle switch each time the carriage completes a revolution about the vertical axis of the bin.

13. Apparatus as set forth in claim 11 wherein the means for effecting sweeping movement of said member about said vertical axis further comprising means for varying the arc through which said member sweeps.

14. Apparatus as set forth in claim 13 wherein the means for varying the arc through which said member sweeps comprises timing means adapted to reverse the direction of rotation of said drive means on the carriage at the end of a predetermined time interval, whereby the direction of rotation of said shaft about its own axis and about said vertical axis is reversed at the end of each timed sweep.

15. Apparatus for stirring a mass of grain stored in a bin comprising
a sweep member,
means mounting said sweep member for rotation in a generally horizontal plane above the mass of grain in the bin about a central vertical axis,
means for effecting sweeping movement of said member around said vertical axis first through a revolution in one direction and then through a revolution in the opposit direction,
at least one auger carrier on said sweep member,
an auger extending downwardly from said auger carrier, and
means for rotating said auger on its axis.

16. Apparatus as set forth in claim 15 wherein said bin includes a roof and wherein said mounting means for the sweep member includes means for suspending the sweep member at one end thereof constituting its inner end from the roof of the bin.

17. Apparatus as set forth in claim 15 wherein said mounting means for the sweep member includes a center post in the bin for rotatably supporting the sweep member at one end thereof constituting its inner end.

18. Apparatus as set forth in claim 15 wherein said means for effecting sweeping movement of said sweep member around said vertical axis comprises a carriage at one end of said sweep member constituting its outer end, wheels on said carriage rolling on a circular track around the bin, reversible drive means on said carriage adapted to roll the wheels on the track thereby rotating said sweep member about the vertical axis of the bin, and means for reversing said drive means upon the completion of each revolution of said sweep member about said vertical axis, whereby the direction of rotation of said sweep member about said vertical axis is reversed upon completion of each revolution of said sweep member about the vertical axis of the bin.

19. Apparatus as set forth in claim 18 wherein the means for reversing said drive means comprises a switch mounted on the carriage, and switch actuating means fixed with respect to the bin for engagement by the switch to actuate the switch each time the carriage completes a revolution about the vertical axis of the bin, the switch being adapted to reverse said drive means upon each actuation thereof.

* * * * *